United States Patent [19]

Nash et al.

[11] 3,805,167

[45] Apr. 16, 1974

[54] DIGITAL PULSE GENERATOR WITH AUTOMATIC DUTY CYCLE CONTROL

[75] Inventors: Charles D. Nash, Broken Arrow; Martin Henry Beauford, Tulsa, both of Okla.

[73] Assignee: The Telex Corporation, Tulsa, Okla.

[22] Filed: June 27, 1972

[21] Appl. No.: 266,713

[52] U.S. Cl....328/61, 307/225, 307/260, 307/265, 307/269, 307/293, 328/48, 328/63

[51] Int. Cl............................ H03k 1/00, H03k 3/04

[58] Field of Search........... 307/265, 269, 220, 225, 307/293; 328/48, 59, 60, 61, 63

[56] References Cited

UNITED STATES PATENTS

| | | | |
|---|---|---|---|
| 3,697,879 | 10/1972 | Holliday | 307/293 |
| 3,388,346 | 6/1968 | Roof et al. | 307/293 |
| 3,454,884 | 7/1969 | Ziehm | 307/293 |

*Primary Examiner*—Stanley D. Miller, Jr.
*Attorney, Agent, or Firm*—Head & Johnson

[57] ABSTRACT

This invention relates to an electronic apparatus for creating rectangular pulses of a selected value of duty cycle and pulse rate, in response to the reception of a series of substantially equally spaced incoming impulses. The output rectangular pulse is provided by a flip-flop which is set by the incoming repetitive pulse. A clock provides a series of pulses, the frequency of which is some multiple of the frequency of the incoming pulse. Two counters are provided, one of which reads the counts in the first part cycle of the output pulse, the second counts the pulses in the second part cycle of the output pulse. The flip-flop is reset by a specific selected count on the first counter. When the selected count is reached, the flip-flop is reset which stops the count of the first counter and starts the counting on the second counter, which counts the clock pulses within the second part cycle of the output pulse. If the number of clock pulses in the second part cycle are equal to or less than or more than a selected number, logic means are provided to select one of three possible counts on the first counter, which on the next cycle will reset the counter.

5 Claims, 2 Drawing Figures

DIGITAL PULSE GENERATOR WITH AUTOMATIC DUTY CYCLE CONTROL

CROSS REFERENCE TO RELATED APPLICATION

This invention is related to the copending application, owned by the same assignee, of Larry W. Fort, Ser. No. 216,534, filed Jan. 10, 1972, entitled AUTOMATIC PULSE WIDTH CONTROL FOR A MONOSTABLE MULTIVIBRATOR.

BACKGROUND OF THE INVENTION

This invention is in the field of the recording and playback of signals recorded on magnetic tapes. More specifically, it is in the field of the recording by phase modulated signals on magnetic tape.

This invention concerns means for generating pulses with a constant ratio of pulse width to repetition interval, when triggered by a periodic signal pulse. In the application of Fort et al. Ser. No. 163,180, an analog system is described by means of which automatic pulse width control is obtainable for a monostable multivibrator. This like most of the prior art, is in analog form and is subject to various noises and errors which complicate the problem. This invention is based upon digital components and techniques, and as a result, is considerably less susceptible to noise than the prior art analog systems. It also has faster response than the prior art analog systems. The present invention also has the advantage that it will not synchronize with a subharmonic signal of the input frequency.

It is a principal object of this invention to provide a digital system for generating pulses of constant ratio of pulse width to repetition interval, when subjected to periodic signal pulses.

BRIEF DESCRIPTION OF THE DRAWINGS

This and other objects of this invention and a better understanding of the principles and details of the invention will be evident from the following description taken in conjunction with the appended drawings, in which.

DESCRIPTION OF THE PREFERRED EMBODIMENT

Figure 1:
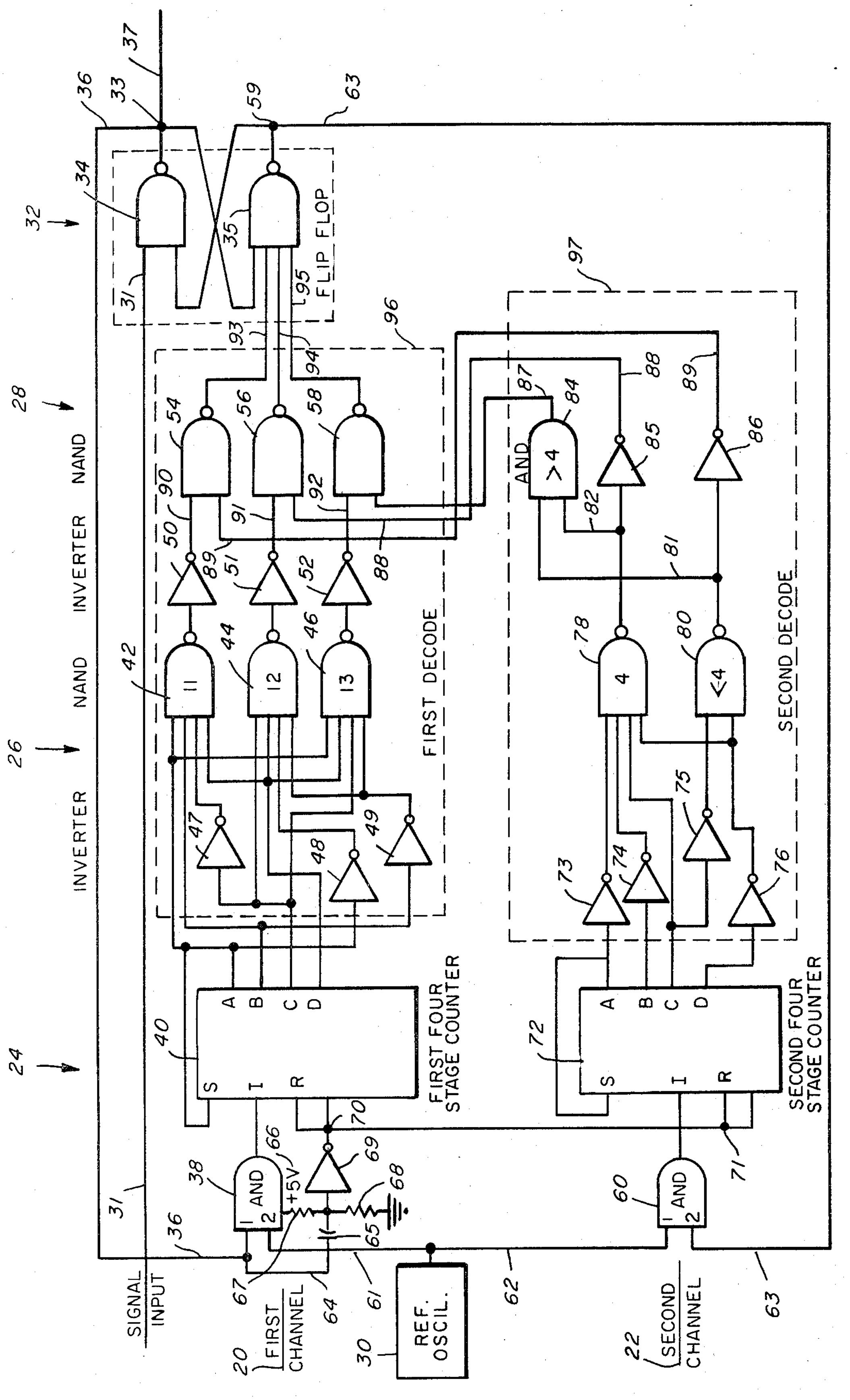
FIG. 1 represents a circuit diagram of the apparatus of this invention.

Referring now to the drawings and particularly to FIG. 1, the numeral 20 represents a first portion, or first channel, of the apparatus which is concerned with the measurement of length of the first part cycle of the output pulse. The numeral 22 indicates a second channel of the apparatus which has to do with the counting of the length of the second part cycle of the output wave. The numeral 24 indicates generally the counter stages, numeral 26 represents the decode stages, and the numeral 28 represents the gates which control the operation of the flip-flop, which is indicated generally by the numeral 32. The flip-flop produces the output wave of the circuit.

The incoming signal arrives on lead 31 and goes directly to the flip-flop 32 and sets the flip-flop. This sends a signal by lead 36 to start the first counter which counts the pulses of the reference oscillator or clock 30. Decode means, including NAND gates, are provided which are activated at the count, for example, of 11, 12, or 13. A clock frequency approximately 16 times the signal frequency has been chosen, so that an optimum value of the first part cycle length, or pulse width, would be a count of 12 of these clock pulses. The gates 28 are activated by the second channel, but assume for the moment that the count of 12 is to be passed. When the first counter 40 reaches the count of 12 the flip-flop 32 is reset. This stops the counter 40 and resets it to zero. It also resets the second counter 72 to zero and now the second counter starts counting, and will count pulses during the second part cycle of the output wave.

When the next signal comes in on line 31 it again sets the flip-flop. This stops the count on the second counter 72 and holds the count in its logic. By the logic of the second decode, determination is made as to whether there are four (which is the nominal value of counts in the second part cycle) or less than four or more than four counts. If there are four counts in the second part cycle, then the gate in the first channel corresponding to twelve counts will be activated. If there are less than four counts then the gate corresponding to 11 counts in the first counter will be activated. Correspondingly, if there are more than four counts in the second part cycle the counter output of 13 counts will be activated to reset the flip-flop. Thus it is seen that by keeping account of the number of clock pulses in the second part cycle, determination is made as to the number of clock pulses that will be accepted in the first counter, to reset the flip-flop in the next cycle of operation. By this means the circuit balances itself and tends to come back to the nominal ratio of 12 to 4 in the first half cycle with respect to the second part cycle, and to maintain an average value of duty cycle of 75 percent, which is in the nominal selected value of operation.

With this brief explanation of the principal of operation of this circuit, detailed explanation of the circuit elements will now be given.

The flip-flop is a conventional circuit element which is available on the market, it has a set terminal at 31, and reset leads on either one or another of the input leads to the NAND gate 35 which are labeled 93, 94 and 95. There are two output terminals 33 and 59. The first output 33 goes to the output lead of the device 37, and also has a feedback to the counter through the NAND gate 38. When the flip-flop is set, the output lead at 33 becomes a voltage one. (For convenience, we will speak of one and zero as the output voltages). The one on output 33 goes by way of lead 36 to terminal 1 of the gate 38, the oscillator, or clock 30 output is connected to the second input of gate 38 so that each cycle when the oscillator puts out a one, the gate 38 will be activated, and will put a one on the input lead I of the first counter 40. This will start the counting the clock pulses.

The counter 40 is a conventional device which is available on the market. There are many manufacturers. One of them is Texas Instruments, Inc., and their catalog number for this device is 7493. Further description is not required, except to say that there are four output terminals A, B, C and D. In operation terminal A becomes a one whenever the count is 1, 3, 5, or 7, etc. Terminal B has a one on counts of 2, 3, 6, and 7, etc. Terminal C has a one on counts of 4 through 7 and 12 through 15, etc., and terminal D has a one on the counts of 8 through 15.

Along the top of FIG. 1 there are the words INVERTER, NAND, etc. which refer to the type of circuit elements indicated by the corresponding numbers below each of these names. Thus the triangular shaped elements 47, 48, 49, 73, 74, 75, 76, etc. are inverters. These simply change the polarity of the signal. Thus, if the signal on terminal C of the first counter 40 is a zero then inverter 47 will put a one on its output, which will go to the NAND gate 42. The NAND refers to the gates 42, 44, 46, 54, 56, 58, etc.

There are four inputs to the NAND gate 42. These are connected respectively to the terminals A, B and D, and through the inverter 47 to terminal C. Now on the count of 11 there will be ones on the terminals A, B and D and a zero on C. The zero on C is inverted by the element 47. On the count of 11 on the counter 40, there will be ones on all of the four inputs to the gate 42. Therefore there will be a zero on the output of the gate 42. The inverter 50 inverts this and puts a one on the line 90 going to the NAND gate 54. There is a second line going to the NAND gate 54, this is 89, and it comes from an inverter 86 which is responsive to the NAND gate 80.

For a moment let us go to the counter 72. It, like the counter 40 has four output terminals A, B, C and D each of which have a one at certain counts. In order for NAND gate 78 to have a zero on its output all four inputs must be ones. We're interested in having that condition arise when there is a count of 4 on the counter 72. On the count of 4 the terminal C has a one, the other three terminals have zeros, but since the terminal A for instance is brought through inverter 73 it will put a one on the input to the gate 78. Similarly terminals B and D on the counter will both have zeros, which through the inverters 74 and 76, place voltages of one on the input to the gate 78. On the count of 4 gate 78 will have a zero on its output which through inverter 85 and lead 88 will put a one on gate 56. This will enable the gate 56 to open whenever the count is appropriate for the gate 44. As was indicated earlier, the decode logic provides for a zero on the output of gate 42 at 11 counts. Correspondingly on the gate 44 there will be a zero at 12 counts and for gate 46 there will be a zero on the output for 13 counts. All of these have inverters 50, 51 and 52, respectively, so that voltages on lines 90, 91 and 92 will be ones at 11, 12 and 13 counts respectively.

We have just seen how gate 78 will have a zero when the count of the second counter 72 is 4, this will place a one voltage on lead 88 so that when the count of counter 40 is 12 counts, and a one is placed on line 91, the gate 56 will open and put a zero on the gate 35. This zero will reset the flip-flop. This puts a zero on terminal 33 and a one on terminal 59. The one on terminal 59 goes by lead 63 to the AND gate 60 which is enabled so that the counts of the clock 30 which go by lead 62 will start the counter 72. Thus counter 72 counts when the flip-flop is reset, counter 40 counts when the flip-flop is set. Counter 40 therefore counts the pulses in the first part cycle, and counter 72 counts the pulses in the second part cycle.

By following the logic as has been described, gate 42 will activate the gate 54 when 11 counts have been counted by the counter 40. Corresponding gate 56 will be activated by the gate 44 after 12 counts and gate 58 will be activated when the gate 56 has had 13 counts. The second inputs to the three gates 54, 56 and 58 come from the second counter. There are three outputs, the gate 78 becomes enabled when four counts have been counted, gate 80 when less than four counts have been counted, and gate 84 becomes enabled when more than four counts have been counted. When four counts have been counted, gate 78 through inverter 85 and lead 88 enables gate 56 to operate when 12 counts are counted on the next half cycle. Gate 80 through inverter 86 and lead 89 enables the gate 54 to open when a count of 11 is obtained, and correspondingly gate 84 enables gate 58 when 13 counts have been recorded.

The logic is this. If less than four counts are received in the second part cycle, let us say three counts have been received, the first part of the following cycle should have 11 counts. Then, on the second part cycle there will be five counts. Thus the count on the second part cycle will vary from three to five and will average out at four. If the count on gate 78 is four this will enable gate 56 which will operate to reset the the flip-flop on 12 counts and so on.

When the flip-flop is reset the voltage on output 59 goes by way of lead 63 to the gate 60. This enables the gate 60 and on the next pulse from the oscillator 30 the counter 72 will start counting. This pulse generated by the flip-flop also goes by way of lead 64 to the condenser 65 through the inverter 69 and applies a short time reset pulse to the terminals R on both of the counters 40 and 72 which resets both counters to count zero. Counter 72 is now counting while counter 40 is idle.

As soon as the signals come in on line 31, it sets the flip-flop 32. The voltage on output 33 goes by way of lead 36 to the gate 38. This enables the gate 38, and on the next pulse from the oscillator 30 the counter 40 will start counting. The gate 60 will be inhibited by the logic 0 applied through lead 63, and counter 72 is idle but has stored the count it had when the signal came in on line 31. Assume the count was 4. The count of 4 is decoded by decode circuit 97 and enables gate 56. When the counter 40 reaches the count of 12, gate 44 then through gate 56 resets the flip-flop. This puts a zero on the terminal 33 and a one on the terminal 59. The zero on the terminal 33 stops the count of the counter 40 and resets both counters to zero count through condenser 65 and inverter 69. The one on the terminal 59 starts the count of the counter 72. Now counter 40 is idle, counter 72 is counting. When the next pulse comes in on 31 and sets the counter again, this puts a zero back on lead 63 and stops the count of the second counter 72. The counter 72 holds its count, and through the logic of the second decode puts an enable on the proper gate 54, 56 or 58 so that when the count comes to the proper value selected by this appropriate enable the flip-flop will again be reset. When it is reset the signal on terminal 33 going by way of lead 36, lead 64 through condenser 65, resets the counters 40 and 72. Since on reset, the counter 72 starts again as soon as it is reset it starts counting and proceeds as described above.

Figure 2:
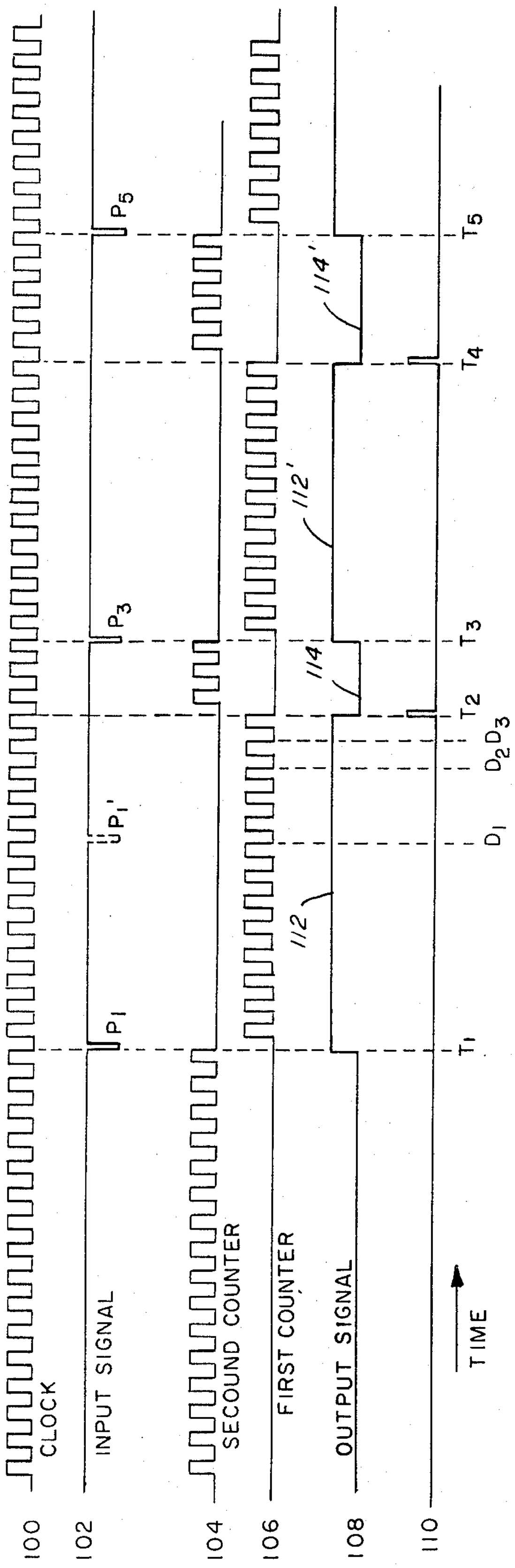
FIG. 2 represents a plurality of traces representing voltages, as a function of time, in various parts of the circuit of FIG. 1.

Refer now to FIG. 2. This shows a group of traces, which show voltage as a function of time. The first trace is the reference oscillator or clock which puts out a square wave of voltage. The frequency of the clock output is approximately 16 times the frequency of the pulses P1, P3, P5, etc. Shown on line 102, which represents the input signals which come by way of line 31. It is these negative pulses, where the voltage drops from one to zero, that sets the flip-flop. Line 104 represents the count of the second counter, while line 106 represents the count of the first counter, that is, the voltage on the input to the first counter. Line 108 represents the voltage output of the flip-flop at terminal 33, and line 110 represents the reset pulses which are generated each time that the flip-flop is reset.

The incoming signal at a time P1 starts the first counter, which starts counting the pulses shown on line 106 at time T1. When this counter reaches its preset enabled value, it resets the flip-flop and the output signal voltage on lead 37 drops from the value 112 down to the value 114. At the same time counter 72 is reset by the pulse on line 110 at T2 and starts counting. It counts during the interval T2 to T3. Assuming that it counts three pulses during that time, it enables the gate 54 so that when the flip-flop is set by the pulse P3 there will be 11 counts and the output voltage will be 112'. After 11 counts the flip-flop will be reset, the pulse T4 generated, and the second counter started, so that during the second half cycle 114', during the interval T4 to T5, there will be five pulses counted. This will then enable the gate 58 to be set and on 13 counts the flip-flop will be reset and so on.

In this description and operation a duty cycle of 75 percent is the design goal with the limits being 55 and 95 percent as the minimum and maximum limits allowed. The reference oscillator repetition rate is approximately sixteen times that of the signal input.

The circuit maintains an average duty cycle of 75 percent by assigning an average of 12 counts of the reference oscillator to the pulse portion of the wave form, and an average of four counts to the off portion of the wave form. If the number of pulses during the off portion of the output wave form is different from four, more or fewer pulses assigned to the pulse portion of the wave form are necessary to achieve less or more reference oscillator pulses during the off portion of the wave form.

In many systems in which a pulse generator of this type is used, there are occasional pulses such as P1' shown on line 102 of FIG. 2. These pulses occur at a time midway between the pulses P1 and P3. By keeping the duty cycle greater than 55 percent, and preferably at a value of 75 percent, there is no opportunity for such pulses as P1' to set the flip-flop, which assures the operation of the flip-flop only on the pulses P1, P3, P5, etc.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A system for generating square wave pulses of selected duty cycle in synchronism with a continuing series of equal-time-spaced input signals, comprising:

a. a flip-flop having a first set input and a second reset input, and first and second outputs, said input signals connected to said set input, said square wave pulses provided at said first output;

b. clock means to provide a square wave signal of substantially constant frequency equal to approximately $x$ times the frequency of said input signal, where $x$ is a selected integer;

c. said first output and said clock means connected through gate means to first counter means to count the pulses of said clock during the time that said flip-flop is in set condition;

d. said second output and said clock means connected through gate means to second counter means to count said clock pulses during the time that said flip-flop is in reset condition; and e. control means responsive to the counts of said first counter and said second counter to reset said flip-flop, the count of said first counter at which said flip-flop is reset, being responsive to the count of said second counter.

2. The square wave pulse generator as in claim 1, in which said control means includes a first plurality of binary gates, the outputs of which control the reset of said flip-flop, and including a second plurality of binary gates with inputs connected to said first counter and outputs connected respectively to said first plurality of gates, a third plurality of binary gates with inputs connected to said second counter, and outputs connected respectively to said first plurality of gates.

3. The square wave pulse generator as in claim 1 including means responsive to the setting of said flip-flop to reset both counters.

4. The square wave pulse generator as in claim 1 in which $x$ is an integer between 10 and 20.

5. The square wave pulse generator as in claim 1 in which $x$ is an integer between 12 and 18.

* * * * *